(12) United States Patent
MacIntyre et al.

(10) Patent No.: US 7,913,249 B1
(45) Date of Patent: Mar. 22, 2011

(54) SOFTWARE INSTALLATION CHECKER

(75) Inventors: Ewan Edwin MacIntyre, Stepps (GB); Andrew James Reid, Thorntonhall (GB)

(73) Assignee: JPMorgan Chase Bank, N.A., New York, NY (US)

( * ) Notice: Subject to any disclaimer, the term of this patent is extended or adjusted under 35 U.S.C. 154(b) by 952 days.

(21) Appl. No.: 11/368,806

(22) Filed: Mar. 7, 2006

(51) Int. Cl.
*G06F 9/44* (2006.01)
*G06F 15/177* (2006.01)
*G06F 15/173* (2006.01)
*G06F 9/00* (2006.01)

(52) U.S. Cl. ........ 717/174; 717/175; 717/176; 717/178; 709/220; 709/221; 709/222; 709/223; 709/224; 714/37; 714/38; 713/1; 713/2; 713/100

(58) Field of Classification Search .......... 717/174–178; 709/220–222, 223, 224, 226; 714/37, 38; 713/1–2, 100
See application file for complete search history.

(56) References Cited

U.S. PATENT DOCUMENTS

| | | | |
|---|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,386,551 A | 1/1995 | Chikira et al. |
| 5,446,895 A | 8/1995 | White et al. |
| 5,539,885 A | 7/1996 | Ono et al. |
| 5,549,117 A | 8/1996 | Tacklind et al. |
| 5,563,998 A | 10/1996 | Yaksich et al. |
| 5,566,297 A | 10/1996 | Devarakonda |
| 5,594,863 A | 1/1997 | Stiles |
| 5,630,047 A | 5/1997 | Wang |
| 5,630,069 A | 5/1997 | Flores et al. |
| 5,638,513 A | 6/1997 | Ananda |
| 5,655,074 A | 8/1997 | Rauscher |
| 5,701,471 A | 12/1997 | Subramanyam |
| 5,712,971 A | 1/1998 | Stanfill et al. |
| 5,721,913 A | 2/1998 | Ackroff et al. |
| 5,721,914 A | 2/1998 | De Vries |
| 5,748,878 A | 5/1998 | Rees et al. |
| 5,752,034 A | 5/1998 | Srivastava |
| 5,758,061 A | 5/1998 | Plum |

(Continued)

FOREIGN PATENT DOCUMENTS

WO   WO 01/74043   10/2001

OTHER PUBLICATIONS

Hamilton, JavaBeans, Sun Microsystems, Chapter 8, Aug. 1997.

(Continued)

*Primary Examiner* — Hyung S Sough
*Assistant Examiner* — Carina Yun
(74) *Attorney, Agent, or Firm* — Hunton & Williams, LLP

(57) ABSTRACT

A software installation checker is disclosed. A small stub application is put inside a desktop package, and is run at certain points during a software installation. The stub contacts a server and fetches a library which comprises a class with a method. The stub runs the method on the class, passing to the class the information as well as the server. The class unpacks an engine and passes control to the engine. The engine runs a check with tasks received from a collector of the server. Data is uploaded to the server, and can be examined via a web interface.

7 Claims, 4 Drawing Sheets

U.S. PATENT DOCUMENTS

| | | | |
|---|---|---|---|
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,806,075 A | 9/1998 | Jain et al. | |
| 5,828,883 A | 10/1998 | Hall | |
| 5,835,770 A | 11/1998 | Shum et al. | |
| 5,842,196 A | 11/1998 | Agarwal et al. | |
| 5,845,292 A | 12/1998 | Bohannon et al. | |
| 5,872,976 A | 2/1999 | Yee et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,995,756 A * | 11/1999 | Herrmann | 717/178 |
| 5,995,965 A | 11/1999 | Experton | |
| 6,003,075 A | 12/1999 | Arendt et al. | |
| 6,009,274 A | 12/1999 | Fletcher et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,061,503 A | 5/2000 | Chamberlain | |
| 6,061,686 A | 5/2000 | Gauvin et al. | |
| 6,067,412 A | 5/2000 | Blake et al. | |
| 6,073,107 A | 6/2000 | Minkiewicz et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,119,101 A | 9/2000 | Peckover | |
| 6,125,390 A | 9/2000 | Touboul | |
| 6,128,708 A | 10/2000 | Fitzpatrick et al. | |
| 6,138,112 A | 10/2000 | Slutz | |
| 6,145,121 A | 11/2000 | Levy et al. | |
| 6,161,139 A | 12/2000 | Win et al. | |
| 6,167,534 A | 12/2000 | Straathof et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,269,479 B1 | 7/2001 | Puram | |
| 6,279,039 B1 | 8/2001 | Bhat et al. | |
| 6,301,701 B1 | 10/2001 | Walker et al. | |
| 6,304,969 B1 | 10/2001 | Wasserman et al. | |
| 6,311,327 B1 | 10/2001 | O'Brien et al. | |
| 6,363,499 B1 | 3/2002 | Delo et al. | |
| 6,363,524 B1 | 3/2002 | Loy | |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,424,981 B1 | 7/2002 | Isaac et al. | |
| 6,438,749 B1 | 8/2002 | Chamberlain | |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,493,871 B1 * | 12/2002 | McGuire et al. | 717/173 |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancesco et al. | |
| 6,601,017 B1 | 7/2003 | Kennedy et al. | |
| 6,601,018 B1 | 7/2003 | Logan | |
| 6,601,233 B1 | 7/2003 | Underwood | |
| 6,626,953 B2 | 9/2003 | Johndrew et al. | |
| 6,629,266 B1 | 9/2003 | Harper et al. | |
| 6,820,088 B1 | 11/2004 | Hind et al. | |
| 6,826,745 B2 | 11/2004 | Coker et al. | |
| 6,895,382 B1 | 5/2005 | Srinivasan et al. | |
| 6,920,467 B1 | 7/2005 | Yoshimoto | |
| 6,934,934 B1 | 8/2005 | Osborne, II et al. | |
| 7,165,087 B1 * | 1/2007 | Graupner et al. | 709/202 |
| 2001/0013004 A1 | 8/2001 | Harris et al. | |
| 2002/0004912 A1 | 1/2002 | Fung | |
| 2002/0104006 A1 | 8/2002 | Boate et al. | |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |
| 2002/0152395 A1 | 10/2002 | Zhang et al. | |
| 2002/0162090 A1 | 10/2002 | Parnell et al. | |
| 2002/0165754 A1 | 11/2002 | Tang et al. | |
| 2002/0174050 A1 | 11/2002 | Eynard et al. | |
| 2002/0184535 A1 | 12/2002 | Moaven et al. | |
| 2003/0004848 A1 | 1/2003 | Hellerstein et al. | |
| 2003/0018573 A1 | 1/2003 | Comas et al. | |
| 2003/0018952 A1 | 1/2003 | Roetzheim | |
| 2003/0033586 A1 | 2/2003 | Lawler | |
| 2003/0041000 A1 | 2/2003 | Zajac et al. | |
| 2003/0065644 A1 | 4/2003 | Horman et al. | |
| 2003/0120539 A1 | 6/2003 | Korium et al. | |
| 2003/0144868 A1 | 7/2003 | MacIntyre et al. | |
| 2003/0188290 A1 | 10/2003 | Corral | |
| 2003/0196190 A1 | 10/2003 | Ruffolo et al. | |
| 2003/0212518 A1 | 11/2003 | D'Alessandro et al. | |
| 2003/0225662 A1 | 12/2003 | Horan et al. | |
| 2003/0225663 A1 | 12/2003 | Horan et al. | |
| 2004/0068723 A1 * | 4/2004 | Graupner et al. | 717/171 |
| 2004/0093255 A1 | 5/2004 | Kelman et al. | |
| 2004/0193913 A1 | 9/2004 | Han et al. | |
| 2004/0254805 A1 | 12/2004 | Schwerin-Wenzel et al. | |
| 2005/0071807 A1 | 3/2005 | Yanai | |
| 2006/0015930 A1 | 1/2006 | Shoham | |
| 2006/0053075 A1 | 3/2006 | Roth et al. | |
| 2007/0168874 A1 * | 7/2007 | Kloeffer et al. | 715/764 |

OTHER PUBLICATIONS

Reinhart, Liability Management: A new Tool for Financial Consultants, Financial Consultant, vol. 1, No. 3, p. 7-11, Fall/Winter 1996, ISSN 1091-644X, Dialog File 15, Accession No. 01395382.

Duggan, 2.40 General—Reviews and Abstracts, SPI Database of Software Technologies, p. 1-5, Feb. 1, 1974.

Agostini, A Light Workflow Management System Using Simple Process Models, Cooperation Technologies Laboratory, Disco-University of Milano-Bicoca, Aug. 2000.

Georgakopoulos, An Overview of Workflow Management: from Process Modeling to Workflow Automation Infrastructure, Kluwer Academic Publishers, Boston, Distributed Parallel Databases, vol. 3, p. 119-153, 1995.

Sammet, Beginning of 4.6 Software Evaluation, Tests and Measurements and RMF I/O Time Validation, Association of Computing Machinery, p. 519.

Muehlen, Business Process Automation and Workflow in the Financial Industry, CSK Software AG, Version 3, pp. 1-37, Sep. 10, 2003.

Code Generation for Database Applications, IBM Corporation, p. 1-3, Mar. 1, 2002.

Mohapatra et al., Defect Prevention through Defect Prediction: A Case Study at Infosys.

Hilbert, Hilbert, et al., An Approach to Large Scale Collection of Application Usage Data Over the Internet, Software Engineering 1998, Proceedings of the 1998 International Conference, Abstract, Apr. 1998.

Hudeponhl et al., Integrating Metrics and Models for Software Risk Assessment, The Seventh International Symposium on Software Reliability Engineering (ISSRE '96), p. 93, Oct. 30, 1996.

OS/2EE Database Manager SQLJRA Remote Protocol, IBM Corporation, IBM TDB N10-93, p. 33-36, Jan. 1, 1993.

Quantitative Monitoring of Software Development by Time-Based and Intercheckpoint Monitoring, Software Engineering Journal, vol. 5, Iss. 1, p. 43-49, Abstract, Jan. 1990.

Basili et al., Understanding and Predicting the Process of Software Maintenance Releases, 18th International Conference on Software Engineering (ICSE '96), Mar. 25-29; p. 464; (Abstract).

Wohlin et al., Understanding the Sources of Software Defects: A Filtering Approach, 8th International Workshop on Program Comprehension (IWPC '00), p. 9, (Abstract), Jun. 10, 2000.

Pitt and McNiff, java, RMI: the Remote Method Inovocation Guide.

Anonymous, Betwixt: Turning Beans into XML, Apache Software Foundation, archived Jun. 20, 2002 at <http://web.archive.org/web/20020620000410/http://jakarta.apahce.org.commons/betwixt/>, p. 1 of 1, Nov. 13, 2005.

Anonymous, Castor: Using Castor XML, ExoLab Group, archived Aug. 27, 2001 at <http://web.archive.org/web/20011019155934/http://www.castor.org/xml-framework.html>, retrieved from the internet on Nov. 11, 2005, 4 pages.

Anonymous, Programmer's Guide; Monitor Client Library 12.5; Document ID 32865:01-1250-01, last revised May 2001, 7 pages.

Campione, et al., Special Edition Using Java Tutorial, Third Edition: A Short Course on the Basics, Addison Wesley Professional ISBN: 0201-70393-9, 21 pages from Chapter 5, Dec. 28, 2000, 22 pages.

McConnell, Gauging Software Readiness with Defect Tracking; IEEE; May/Jun. 1997, 2 pages.

Yu, et al., An Analysis of Several Software Defect Models; IEEE Transactions on Software Engineering, vol. 14., No. 9; Sep. 1988, 10 pages.

* cited by examiner

10-Nov 16:35h BST: 1251 unique hosts so far

*Region Filter:* All Regions EMEA NALA AP
*Entries per Hostname:* Newest Only All Entries
*Maximum Rows:* 20 No Limit
*Hide Rows to Date:* Don't Hide Hide
Reset Filters

| Date (BST) | App | Op | Version | UserGID | Hostname | Site | Region | Savant Data Source | OfficeXP | GPSS |
|---|---|---|---|---|---|---|---|---|---|---|
| 10-Nov 16:31 | SavanT | install | 4.1.1.0 | U017225 | LNYCADE782KK0V6 | NYC277 | NALA | None | SP3 R1 | Not installed |
| 10-Nov 16:30 | SavanT | install | 4.1.1.0 | U291622 | LNYCRESFL7YL71 | NYC277 | NALA | None | SP2 R1? | 3.1.1 |
| 10-Nov 16:16 | SavanT | install | 4.1.1.0 | U201329 | LSF04TL3NWQW71 | SF0560 | NALA | NALA | SP2 R1 | 3.1.1 |
| 10-Nov 16:08 | SavanT | install | 4.1.1.0 | E140888 | WLDNEQ9N18C01 | LDN | EMEA | NALA | SP3 R2 | 3.1.1 |
| 10-Nov 15:38 | SavanT | install | 4.1.1.0 | UL99288 | LMFCW077CL901S | MFC | AP | AP | SP1 R1 | 3.1.1 |
| 10-Nov 15:06 | SavanT | install | 4.1.1.0 | 1015892 | WTW1CATT7KK9LS | TW1C | AP | None | SP2 R1 | Not installed |
| 10-Nov 14:16 | gps | install | 3.2.0 | U058933 | WLDNEQH038C01 | LDN | EMEA | EMEA | SP3 R2 | Not installed |
| 10-Nov 14:15 | SavanT | install | 4.1.1.0 | 0013388 | WTKPW27468Y61S | TKP | AP | AP | SP3 R2 | 3.1.1 |
| 10-Nov 13:09 | SavanT | install | 4.1.1.0 | E014325 | WLDNEQR85G01 | LDN | EMEA | Non Prod | SP2 R1 | Not installed |
| 10-Nov 12:47 | gps | install | 3.1.1 | U278326 | WLDNEQ0Y17H01 | LDN | EMEA | EMEA | SP3 R2 | Not installed |
| 10-Nov 11:58 | bigred | install | 2.2.1 | U292375 | WKORSRE9799MA4 | KOR2 | AP | None | SP2 R1 | 3.1.1 |
| 10-Nov 11:51 | gps | preinstall | 3.2.0 | U147406 | WGLA1B35RK501 | GLA | EMEA | None | | Not installed |
| 10-Nov 10:51 | gps | install | 3.2.0 | UTRAINZ | WHKG5MS3924129 | HKG001 | AP | AP | SP2 R1 | Not installed |
| 10-Nov 10:29 | SavanT | install | 4.1.1.0 | U28550B | WJPNEQ9727V36 | JPN | AP | AP | SP2 R1 | 3.1.1 |
| 10-Nov 09:11 | gps | install | 3.1.1 | B008626 | WTKP5MS123WFLS | TKP | AP | None | SP2 R1 | 3.1.1 |
| 10-Nov 09:03 | bigred | install | 2.2.1 | W015718 | WHKGSM58HLC51X | HKG001 | AP | AP | SP2 R1 | 3.1.1 |
| 10-Nov 09:00 | SavanT | install | 4.1.1.0 | U060236 | LLDNEQ65NCON3 | LDN | EMEA | EMEA | SP3 R2 | 3.1.1 |
| 10-Nov 08:01 | gps | install | 3.2.0 | 0810867 | WAUSETSPYS9B1S | AUSSYD | AP | AP | SP2 R1 | Not installed |
| 10-Nov 05:26 | gps | install | 3.1.1 | D102292 | WTKPW27D9SY71S | TKP | AP | EMEA | SP3 R2 | 3.1.1 |
| 10-Nov 04:51 | gps | check | 3.1.1 | V623915 | W8KKSMS1B8X81S | BKK | AP | AP | SP2 R1 | 3.1.1 |

SOFTWARE INSTALLATION CHECKER

FIELD OF THE INVENTION

The present invention relates to a software tool for testing and monitoring software installation, and reporting testing results.

BACKGROUND OF THE INVENTION

Our daily work and life is becoming more and more related to computers and software. From time to time, new software is added to and existing software is upgraded in existing networked computers. Whether the newly-added or upgraded software operates reliably depends, for the most part, on whether the software is properly installed at the beginning. Hence, a mechanism needs to be designed for testing and monitoring software installation in the networked computers by a combination of desktop and server software, and reporting the testing results to a system administrator so that any problems arising during the installation can be detected and fixed promptly.

SUMMARY OF THE INVENTION

Therefore, an object of the present invention is to build up a software tool for testing and monitoring whether software applications are properly installed in networked computers, and reporting the testing results to a network server so that installation problems can be detected and fixed promptly.

In accordance with an aspect of the present invention, a software installation checker comprises an executable stub which is installed in the networked computers and is used to obtain a bootstrapper from a server at run time.

In accordance with another aspect of the present invention, a software installation checker comprises a bootstrapper which is used to prepare an engine for execution.

In accordance with a yet another aspect of the present invention, a software installation checker comprises an engine which performs the installation check.

In accordance with a further aspect of the present invention, a software installation checker comprises a collector which instructs the engine what tasks will be carried out.

In accordance with a yet further aspect of the present invention, a software installation checker comprises a user interface which is used for querying and reporting on the gathered data.

In according with a still further aspect of the present invention, a software installation checker comprises a database which is used for storing the data collected during the check.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIG. 2 is a diagram illustrating exemplary display contents of the data collected during an installation check by a user interface in accordance with one embodiment of the present invention.

DETAILED DESCRIPTION OF THE INVENTION

Figure 1:
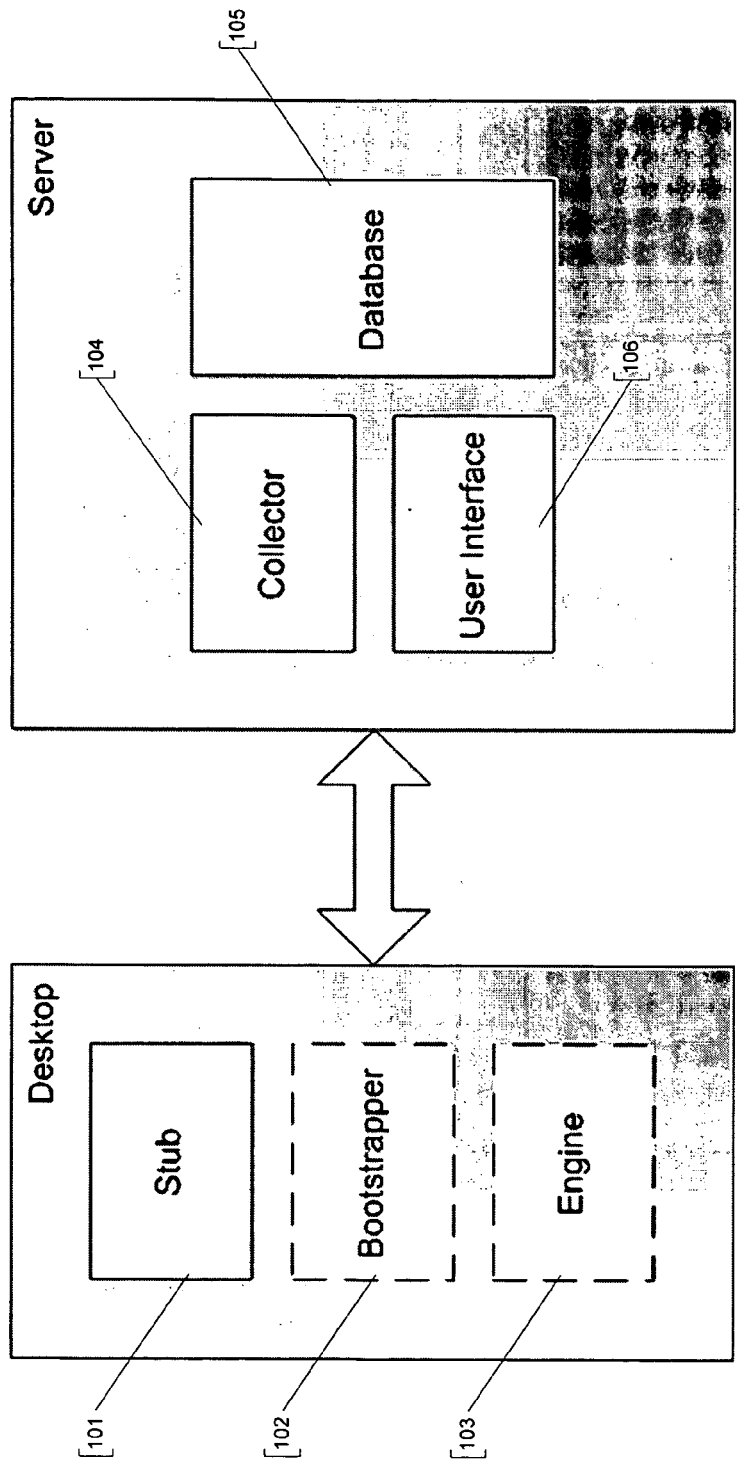
FIG. 1 is a block diagram illustrating an embodiment of a software installation checker.

FIG. 1 is a block diagram illustrating an embodiment of a software installation checker 100. The software installation checker comprises a stub 101, a bootstrapper 102, an engine 103, a collector 104, a database 105, and a user interface 106.

The stub is an executable application which is the only installed component of the software installation checker on a networked computer. The stub can be (but is not limited to) a small C# application, and is installed as a part of an infrastructure package which supports software applications in a networked computer. According to another approach, the stub can also be installed with an individual software application, in which it only checks installation of that particular software.

The bootstrapper is a class existing in a library (e.g., DLL) which is fetched and downloaded from a known uniform resource location (URL) via a request by the stub. The stub is configured with a list of URLs so that the bootstrapper can be fetched from any of the sites. The bootstrapper is used to unpack any data it finds in the library (e.g., the engine) into a temporary folder created in a desktop user's local profile and pass control to it.

The engine is an executable application and can perform a number of checking tasks. For example, modifying a target computer; getting information on files in a directory such as filename, size, and an MD5checksum; getting information from a location in a registry; getting information about a installed software; getting information about Microsoft Office application configuration; getting a specific file; and getting environment variables. Furthermore, within a particular installation check, each of the above checking tasks could be run separately or in combination.

The collector is a server component which tells the engine what tasks to run on the designated computer and collects the checking results.

The database is a server component used for storing the data collected during the check. In a preferred embodiment, a HSQLDB pure Java database is used.

The user interface is a server component which presents and reports the data collected during the check to a system administrator. The user interface can configure display contents using different set of rules. The display contents can be added to or modified without rerunning the check on the designated computer.

It should be understood that the collector is a separate component from the user interface. The user interface contains predefined rules to processing the collected data, which could be updated without interrupting the upload of data.

FIG. 2 is a diagram illustrating exemplary display contents of the data collected during an installation check by a user interface in accordance with one embodiment of the present invention. The Op, App and Version fields in the displayed screen are used to describe why the check was run. For example, when the installed software application to be checked is an infrastructure package named GPS, Op is set to "install", App to "gps", and Version to whatever the version is. If a desktop user decides to manually check an installation, then Op is set to "check", App to "gps", and Version is blank.

Figure 3:
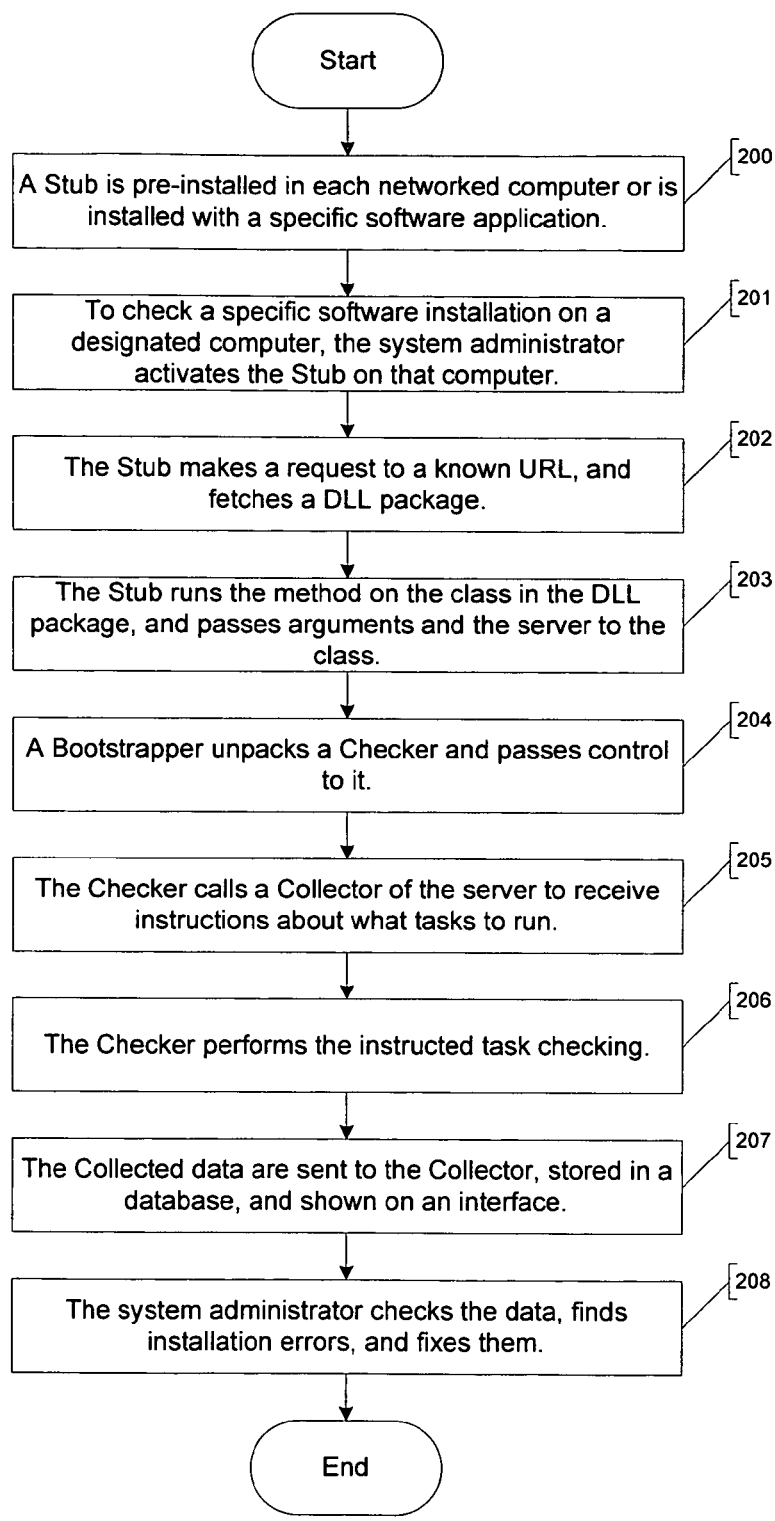
FIG. 3 is a flowchart showing a software installation checking process in accordance with one embodiment of the present invention.
Figure 4:
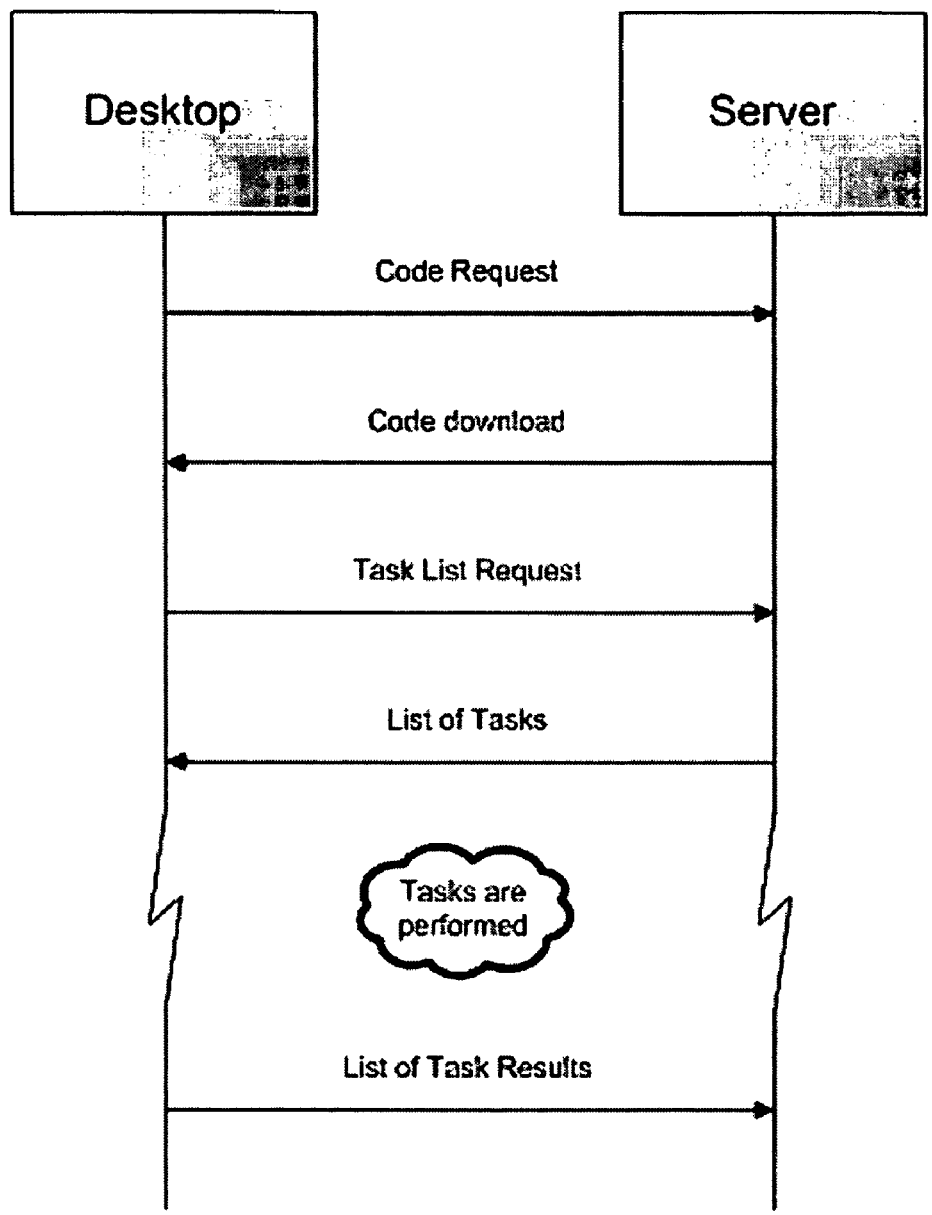
FIG. 4 is a diagram illustrating software installation checking sequences in accordance with one embodiment of the present invention.

FIG. 3 is a flowchart showing a software installation checking process in accordance with one embodiment of the present invention. FIG. 4 is a diagram illustrating software installation checking sequences in accordance with one embodiment of the present invention. The process of FIG. 3 is described in connection with the sequences of FIG. 4 in order to set forth the process in a concrete fashion easily understood by the person of ordinary skills.

As set forth in step 200 of FIG. 3, a stub is pre-installed in each networked computer as a part of an infrastructure to support software applications or included in the installer of an individual software application. When the stub is activated and run by a system administrator or a desktop user 201, it makes a request to a known uniform resource location (URL) with parameters which reflect specific information about the run of the check (namely, the application ID, the version, and the operation control), and fetches and downloads a library (e.g., DLL) 202 (also as shown in FIG. 4). The library comprises a class with a method. The class is looked for by the stub once it has the library. Then the Stub runs the method on the class, passing to the class the information (namely, the application ID, the version, and the operation control) as well as the server from which the library was fetched 203.

The implementation of the class in the library is to embed a bootstrapper, which unpacks any data found in the library including an engine into a temporary folder created in the user's local profile and passes control to the engine 204. To determine which tasks are run, the engine calls a collector which is a functional unit of the server 205 (also as shown in FIG. 4). The collector instructs the engine what tasks to run on the designated computer (as shown in FIG. 4). The engine then performs the check 206. Once the check is completed, the collected data and information are sent back to the collector, stored in the database of the server, and presented in pre-designed reporting forms via a user interface of the server 207 (also as shown in FIG. 4). Based on these reported data, the system administrator could promptly find and fix installation errors 208.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

The invention claimed is:

1. A process for checking and monitoring, by a network server, whether a software application is properly installed in a networked computer, comprising:
   (a) pre-installing, in the networked computer, a stub as a part of an infrastructure which is used to support software applications, said stub being an executable application;
   (b) activating the stub, by a system administrator of the server, on the networked computer on which an installation of a software application will be checked;
   (c) making a request for checking the installation of the software application, by the stub, to a known uniform resource location (URL) with parameters which define the check on the designated software application;
   (d) fetching a library from the URL by the stub, said library comprising a class with a method, and said class being an executable application;
   (e) running the method, by the stub, and passing arguments to the class, wherein the arguments comprise an identification, a version, and an operation of the designated software application and of the server from which the library was fetched;
   (f) unpacking an engine in the library, by the class, into a temporary folder created in an user's local profile, and passing control to the engine, said engine being an executable application to perform the check on the designated software application;
   (g) calling a collector of the server, by the engine, to receive instructions from the collector about what tasks will be run by the engine;
   (h) running the instructed tasks, collecting data arising from the check, sending the data to the collector, and storing the data in a database of the server, by the checker; and
   (i) presenting the checking results using predefined rules, via a user interface, by the system administrator, for finding and fixing installation errors.

2. The process of claim 1, wherein said parameters comprise the identification, the version, and the operation, of the software application which will be tested.

3. A process for checking and monitoring, by a network server, whether a software application is properly installed in a networked computer, comprising:
   (a) including a stub in the installer of an individual software application which is installed in the networked computer, said stub being an executable application;
   (b) activating the stub by a user of the computer on which the installed software will be checked;
   (c) making a request for checking the installation of the software application, by the stub, to a know uniform resource location (URL) with parameters which define the check on the designated software application;
   (d) fetching a library from the URL by the stub, said library comprising a class with a method, and said class being an executable application;
   (e) running the method, by the stub, and passing arguments to the class, wherein the arguments comprise an identification, a version, and an operation of the designated software application and of the server from which the library was fetched;
   (f) unpacking an engine in the library, by the class, into a temporary folder created in the user's local profile, and passing control to the engine, said engine being an executable application to perform the check on the designated software application;
   (g) calling a collector of the server, by the engine, to receive instructions from the collector about what tasks will be run by the engine;
   (h) running the instructed tasks, collecting data arising from the check, sending the data to the collector, and storing the data in a database of the server, by the checker; and
   (i) presenting the checking results using predefined rules, via a user interface, by a system administrator, for finding and fixing installation errors.

4. The process of claim 3, wherein said parameters comprise the identification, the version, and the operation of the software application which will be tested.

5. A software installation checker for checking and monitoring, by a software server, whether a software application is properly installed in a networked computer, comprising:
   (a) an executable stub, in the form of an application tangibly disposed on the networked computer, pre-installed as a part of an infrastructure package which is used to support software applications in the networked computer or included in the installer of an individual software application which is installed in the networked computer, activated by a system administrator of the server, and making a request to a known uniform resource location (URL) with parameters which define the check on the designated software application;
(b) an executable class, existing in a library which is fetched by said stub from the URL, receiving arguments via running a method existing in the library;
(c) an executable engine which is included in the library, unpacked by the class into a temporary folder created in the user's local profile, receiving control from the class, and running the check on the designated software application;
(d) a collector, being a component of the server, and instructing the engine about what tasks will be run by the executable engine;
(e) a database, storing the data collected from the check; and
(f) an user interface, presenting the checking results using predefined rules by the system administrator for finding and fixing installation errors.

6. The software installation checker of claim 5, wherein said parameters comprise an identification, a version, and an operation of the software application which will be checked.

7. The software installation checker of claim 5, wherein said arguments comprise the identification, the version, and the operation of the software application which will be tested, and of the server from which the library was fetched.

* * * * *